United States Patent
Hoshino

(10) Patent No.: US 9,388,315 B2
(45) Date of Patent: Jul. 12, 2016

(54) FLUORINATED ETHER COMPOSITION, ITS PRODUCTION METHOD, COATING LIQUID, AND METHOD FOR PRODUCING SUBSTRATE HAVING SURFACE-TREATED LAYER

(71) Applicant: ASAHI GLASS COMPANY, LIMITED, Chiyoda-ku (JP)

(72) Inventor: Taiki Hoshino, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 110 days.

(21) Appl. No.: 14/221,609

(22) Filed: Mar. 21, 2014

(65) Prior Publication Data

US 2014/0202355 A1 Jul. 24, 2014

(30) Foreign Application Priority Data

Sep. 21, 2011 (JP) ................... 2011-206033

(51) Int. Cl.

| C09D 5/00 | (2006.01) |
|---|---|
| C09D 4/00 | (2006.01) |
| C08L 71/00 | (2006.01) |
| C08G 65/00 | (2006.01) |
| C09D 5/16 | (2006.01) |
| C09D 171/02 | (2006.01) |
| C08L 71/02 | (2006.01) |
| C09D 171/00 | (2006.01) |

(52) U.S. Cl.
CPC ............ *C09D 5/1625* (2013.01); *C08G 65/007* (2013.01); *C08L 71/00* (2013.01); *C08L 71/02* (2013.01); *C09D 4/00* (2013.01); *C09D 5/1637* (2013.01); *C09D 171/00* (2013.01); *C09D 171/02* (2013.01); *C08G 2650/48* (2013.01)

(58) Field of Classification Search
CPC ...... C09D 4/00; C09D 5/1625; C09D 171/02; C08L 71/02
See application file for complete search history.

(56) References Cited

FOREIGN PATENT DOCUMENTS

| JP | 62-48724 | 3/1987 |
|---|---|---|
| JP | 11-500129 | 1/1999 |
| JP | 2002-88090 | 3/2002 |
| JP | 2010-502784 | 1/2010 |
| JP | 2010-503020 | 1/2010 |
| JP | 2011-116947 | 6/2011 |
| WO | 2009/008380 | 1/2009 |
| WO | 2011/059430 | 5/2011 |
| WO | WO 2011/059430 A1 * | 5/2011 |

OTHER PUBLICATIONS

Marciniec, Hydrosilylation, Advances in Silicon Science, Springer, pp. 3-51, 2009.*
Carlo et al, American Chemical Society, News Releases, Toward making smart phone touch-screens more glare and smudge resistant, 2009, pp. 1-2, recovered from http://www.sciencedaily.com/releases/2009/08/090819153915.htm on Dec. 3, 2015.*
International Search Report issued Dec. 25, 2012 in PCT/JP2012/074079 filed Sep. 20, 2012.

* cited by examiner

*Primary Examiner* — Paul A Zucker
(74) *Attorney, Agent, or Firm* — Oblon, McClelland, Maier & Neustadt, L.L.P

(57) ABSTRACT

A fluorinated ether composition comprising at least two types of fluorinated ether compounds represented by A-O-$R^F$-B, differing in group B, in a proportion of group (5-1) being from 90 to 95 mol % and a proportion of group (5-2) being from 5 to 10 mol % to the total amount of groups B. A is a $C_{1-6}$ perfluoroalkyl group or B. $R^F$ is —$(CF_2CF_2O)_b(CF(CF_3)CF_2O)_c(CF_2O)_d(CF_2CF_2CF_2O)_e$—, and the binding order of repeating units is not limited. b, c, d and e are each independently an integer of at least 0, and b+c+d+e is from 5 to 150.

| —$(CF_2)_a CFXCH_2OCH_2CH_2CH_2SiL_mR_n$ | Group (5-1) |
|---|---|
| —$(CF_2)_a CFXCH_2OCH_2CH(SiL_mR_n)CH_3$ | Group (5-2) |
| —$(CF_2)_a CFXCH_2OCH_2CH{=}CH_2$ | Group (5-3) |
| —$(CF_2)_a CFXCH_2OCH{=}CHCH_3$ | Group (5-4) | a is 0 or 1, X is F or $CF_3$, L is a hydrolyzable group, R is a hydrogen atom or a monovalent hydrocarbon group, m is an integer of from 1 to 3, n is an integer of from 0 to 2, and m+n=3.

13 Claims, No Drawings

FLUORINATED ETHER COMPOSITION, ITS PRODUCTION METHOD, COATING LIQUID, AND METHOD FOR PRODUCING SUBSTRATE HAVING SURFACE-TREATED LAYER

TECHNICAL FIELD

The present invention relates to a fluorinated ether composition suitably used for surface treatment to impart water/oil repellency to a substrate surface, a method for producing such a fluorinated ether composition, a coating liquid containing such a fluorinated ether composition, and a method for producing a substrate having a surface-treated layer using such a fluorinated ether composition or a coating liquid.

BACKGROUND ART

A fluorinated compound is suitably used as a surface treating agent since it has high lubricity, water/oil repellency, etc. By imparting water/oil repellency to a substrate surface, stains will easily be wiped off, and stain removability will be improved.

For example, a touch panel is required to have performance maintained for a long period of time, such that the water/oil repellency will hardly be decreased even after repeatedly rubbed with fingers, and finger prints can easily be removed by wiping.

Among fluorinated compounds, a compound having as a main chain a perfluoropolyether chain in which an ether bond (—O—) is present in the middle of a perfluoroalkyl chain is a compound excellent in the flexibility and is particularly excellent in the fat and oil stain removability.

Use of a fluorinated ether compound having a perfluoropolyether chain as a main chain and having a hydrolyzable silyl group at its terminal, as a surface treating agent such as an antifouling agent, a lubricant or a water/oil repellent, has been known (Patent Documents 1 and 2).

A fluorinated ether compound having a hydrolyzable silyl group at its terminal tends to have favorable durability since the hydrolyzable silyl group is chemically bonded to the surface of a substrate. Example 1 in Patent Document 1 is an Example in which $CF_3CF_2CF_2(OCF_2CF_2CF_2)_{22}OCF_2CF_2CH_2OCH_2CH_2CH=CH_2$ having an allyl group at its terminal and trichlorosilane are reacted in the presence of a platinum catalyst to produce the following compound (i). It is disclosed that the following compounds (II) and (iii) form as by-products, and their molar ratio is (i)/(ii)/(iii)=85 mol %/2 mol %/13 mol %.

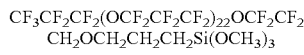

Compound (i)

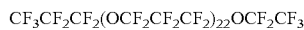

Compound (ii)

Compound (iii)

Patent Document 2 discloses an Example in which $R^{F1}O(CF_2CF_2O)_aCF_2CH_2OH$ and $Cl—CH_2CH_2CH_2—SiL_pR_{3-p}$ are reacted in the presence of sodium hydride to obtain a fluorinated ether composition containing as the main component $R^{F1}O(CF_2CF_2O)_aCF_2CH_2OCH_2CH_2CH_2—SiL_pR_{3-p}$ (paragraphs [0052] and [0053]).

Since a compound having an allyl group at its terminal is not used as the material, a by-product having —OCH$_2$CH(SiL$_n$R$_{3-n}$)CH$_3$ at its terminal will not form.

PRIOR ART DOCUMENTS

Patent Documents

Patent Document 1: WO2011/059430
Patent Document 2: WO2009/008380

DISCLOSURE OF INVENTION

Technical Problem

According to findings by the present inventor, when the fluorinated ether composition as disclosed in Patent Document 1 or 2 is used for surface treatment of a substrate, no sufficient abrasion resistance is obtained in some cases.

Under these circumstances, it is an object of the present invention to provide a fluorinated ether composition which can impart favorable water/oil repellency to a substrate surface, which is excellent in the abrasion resistance and the water/oil repellency of which will hardly be decreased even by repeated rubbing, and which can easily be produced.

Another object of the present invention is to provide a method for producing such a fluorinated ether composition.

Another object of the present invention is to provide a coating liquid containing such a fluorinated ether composition and a medium, and a method for producing a substrate having a surface-treated layer using such a coating liquid.

Still another object of the present invention is to provide a method for producing a substrate having a surface-treated layer using such a fluorinated ether composition.

Solution to Problem

The present invention provides a fluorinated ether composition, its production method, a coating liquid and a method for producing a substrate having a surface-treated layer, [1] to [13].

[1] A fluorinated ether composition comprising at least two types of fluorinated ether compounds represented by the following formula (1) differing in group B, in a proportion of a group represented by the following formula (5-1) being from 90 to 95 mol % and a proportion of a group represented by the following formula (5-2) being from 5 to 10 mol % to the total amount of groups B present in the composition:

$$A—O—R^F—B \quad (1)$$

in the formula (1), the symbols are as follows:
A: a $C_{1-6}$ perfluoroalkyl group, or B;
$R^F$: a linking group represented by the following formula (2):

(2)

in the formula (2), the symbols are as follows:
b, c, d and e: each independently an integer of at least 0, and b+c+d+e is from 5 to 150; and in the formula (2), the binding order of repeating units of $(CF_2CF_2O)$, $(CF(CF_3)CF_2O)$, $(CF_2O)$ and $(CF_2CF_2CF_2O)$ is not limited, and they may be bonded randomly or in a block;
B: a group represented by the following formula (5-1), a group represented by the following formula (5-2), a group represented by the following formula (5-3) or a group represented by the following formula (5-4):

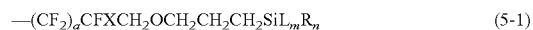

(5-1)

(5-2)

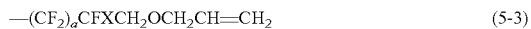

$$—(CF_2)_aCFXCH_2OCH_2CH=CH_2 \quad (5\text{-}3)$$

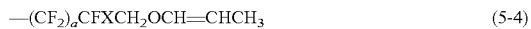

$$—(CF_2)_aCFXCH_2OCH=CHCH_3 \quad (5\text{-}4)$$

in the formulae (5-1) to (5-4), the symbols are as follows:
a: 0 or 1;
X: F or $CF_3$;
L: a hydrolysable group;
R: a hydrogen atom or a monovalent hydrocarbon group; and
m and n: m is an integer of from 1 to 3, n is an integer of from 0 to 2, and m+n=3.

[2] The fluorinated ether composition according to [1], wherein the total proportion of the group represented by the formula (5-1) and the group represented by the formula (5-2) is from 98 to 100 mol % to the total amount of the groups B present in the composition.

[3] The fluorinated ether composition according to [1] or [2], wherein L is a $C_{1-4}$ alkoxy group or a halogen atom.

[4] A method for producing a fluorinated ether composition, which comprises reacting a compound represented by the following formula (3) and a compound represented by the following formula (4) in the presence of a radical generator to obtain the fluorinated ether composition as defined in [1]:

$$A^1\text{-}O—R^F—B^1 \quad (3)$$

$$HSiL^1_mR_n \quad (4)$$

in the formulae (3) and (4), the symbols are as follows:
$A^1$: the same $C_{1-6}$ perfluoroalkyl group as A in the formula (1) or $B^1$;
$R^F$: the same group as $R^F$ in the formula (1);
$B^1$: a group represented by the formula (5-3);
$L^1$: a hydrolysable group;
R: the same group as R in the formula (1); and
m and n: respectively the same numbers as m and n in the formula (1).

[5] The method for producing a fluorinated ether composition according to [4], wherein the radical generator is an organic peroxide.

[6] The method for producing a fluorinated ether composition according to [4] or [5], wherein the compound represented by the formula (3) and the compound represented by the formula (4) wherein $L^1$ is a chlorine atom are reacted, and then $L^1$ in the reaction product is converted to an alkoxy group to obtain the fluorinated ether composition as defined in [1] wherein L is an alkoxy group.

[7] A coating liquid containing the fluorinated ether composition as defined in any one of [1] to [3], and a liquid medium.

[8] The coating liquid according to [7], wherein the liquid medium contains at least one fluorinated organic solvent selected from the group consisting of a fluorinated alkane, a fluorinated aromatic compound and a fluoroalkyl ether.

[9] A method for producing a substrate having a surface-treated layer, which comprises applying the fluorinated ether composition as defined in any one of [1] to [3] to the surface of a substrate by vacuum deposition.

[10] A method for producing a substrate having a surface-treated layer, which comprises applying the coating liquid as defined in [7] or [8] on the surface of a substrate, and removing the liquid medium.

[11] The method for producing a substrate having a surface-treated layer according to [9] or [10], wherein the material of the surface of the substrate is a metal, a resin, glass, a ceramic or a composite material thereof.

[12] A substrate having a surface-treated layer, obtained by treatment with the fluorinated ether composition as defined in any one of [1] to [3].

[13] A touch panel having a surface-treated layer obtained by treatment with the fluorinated ether composition as defined in any one of [1] to [3] on an input screen.

Advantageous Effects of Invention

The fluorinated ether composition of the present invention can easily be produced and can impart favorable water/oil repellency to a substrate surface. By subjecting a substrate surface to surface treatment using the fluorinated ether composition or a coating liquid containing the fluorinated ether composition, a substrate which is excellent in the abrasion resistance, and the water/oil repellency of which will hardly be decreased by repeated rubbing, can be obtained.

By using the fluorinated ether composition or the coating liquid of the present invention to produce a substrate having a surface-treated layer, a substrate having a surface-treated layer, which has excellent water/oil repellency on the surface of the substrate, which is excellent in the abrasion resistance, and on the surface of which the water/oil repellency will hardly be decreased even by repeated rubbing, can be obtained.

DESCRIPTION OF EMBODIMENTS

The surface-treated layer in the present invention is a layer formed on the surface of a substrate by subjecting a substrate to surface treatment with the fluorinated ether composition or the coating liquid of the present invention.

By the surface treatment with the fluorinated ether composition or the coating liquid, as described hereinafter, a hydrolyzable silyl group ($—SiL_mR_n$) in the fluorinated ether composition of the present invention is hydrolyzed to form a Si—OH group (silanol group), such silanol groups are intermolecularly reacted to form a Si—O—Si bond, or such a silanol group undergoes dehydrative condensation reaction with a hydroxy group (substrate-OH) on the surface of the substrate to form a chemical bond (substrate-O—Si).

That is, the surface-treated layer in the present invention is a layer composed of fluorinated ether residue on the substrate surface, formed by bonding of the fluorinated ether compound of the present invention mutually or to the substrate surface by the above reaction.

In the present invention, a fluorinated ether compound represented by the formula (1) will sometimes be referred to as compound (1). Likewise, a compound represented by the formula (3) as compound (3), and a compound represented by the formula (4) as compound (4). Further, a group represented by the formula (5-1) will sometimes be referred to as group (5-1), and likewise, groups represented by the formulae (5-2), (5-3) and (5-4) as groups (5-2), (5-3) and (5-4), respectively.

In the present invention, to calculate the proportion (breakdown of groups (5-1) to (5-4)) of the groups B, groups (5-1) to (5-4) are identified by $^1$H-NMR (solvent: $CDCl_3$, internal standard: TMS) to calculate the molar ratios of the respective groups. That is, the molar ratio of each group is calculated from the proportion of one obtained by dividing the integrated intensity of a portion in a bracket ⌈ ⌋ by the number of hydrogen atoms. With respect to the group (5-4), a cis-form (hereinafter referred to as group (5-4c)) and a trans-form (hereinafter referred to as group (5-4t)) are respectively identified and the respective molar ratios are calculated.

$$—(CF_2)_aCFXCH_2OCH_2CH_2⌈CH_2⌋SiL_mR_n \quad (5\text{-}1)$$

$$—(CF_2)_aCFXCH_2OCH_2CH(SiL_mR_n)⌈CH_3⌋ \quad (5\text{-}2)$$

$$—(CF_2)_aCFXCH_2OCH_2CH=⌈CH_2⌋ \quad (5\text{-}3)$$

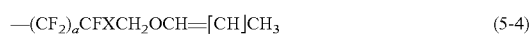

$$—(CF_2)_aCFXCH_2OCH=⌈CH⌋CH_3 \quad (5\text{-}4)$$

The average molecular weight (Ma) of the fluorinated ether compound represented by the formula (1) present in the fluorinated ether composition of the present invention is a value obtained by the following method by means of NMR analysis method. That is, by $^{19}$F-NMR (solvent: CDCl$_3$, internal standard: CFCl$_3$), the repeating units of R$^F$ are identified and the number (b to e) of the repeating units are calculated, and the average molecular weight of R$^F$ per one molecule is calculated. Then, by $^1$H-NMR (solvent: CDCl$_3$, internal standard: TMS), terminal groups A and B are indentified and quantitatively determined, and based on the number of moles of the terminal groups, the average molecular weight (Ma) of the fluorinated ether compound is calculated.

In a case where the after-mentioned compound (3) wherein A$^1$ is a C$_{1-6}$ perfluoroalkyl group and the after-mentioned compound (4) are respectively composed substantially of a single compound, the individual compound (1) formed from them is a compound having either of groups (5-1), (5-2) and (5-4), and the reaction product is as a whole a mixture of at least two types of compounds (1) differing in B, including a compound having an unreacted group (5-3). In the case of the after-mentioned compound (3) wherein A$^1$ is B$^1$, a compound (1) in which the two B's in one molecule are different from each other, may form. Further, in a case where the compound (3) is a polymer having a large number of repeating units in R$^F$, the compound (3) may be a compound group having a molecular weight distribution, and even in such a case, the compound (3) is regarded as a substantially single compound. Accordingly, the compound (1) as a reaction product has a molecular weight distribution derived from R$^F$, this compound is regarded as a single compound.

[Fluorinated Ether Composition]

The fluorinated ether composition of the present invention is a composition comprising at least two types of fluorinated ether compounds represented by the formula (1) differing in group B.

The fluorinated ether composition of the present invention is not limited to a composition consisting of a group of at least two types of compounds (1) differing in B, to be obtained when the after-mentioned compound (3) and the after-mentioned compound (4) are respectively composed substantially of a single compound. For example, it may be a composition comprising a group of at least two types of compounds (1) differing in B, obtained by using at least either of two types of compounds (3) and at least two types of compounds (4), or may be a composition obtained by mixing separately produced compounds (1). For example, in a group of compounds (1), at least two different groups of each of R$^F$, groups (5-1), (5-2), (5-3) and (5-4) and a hydrolyzable silyl group (—SiL$_m$R$_n$) group may be present.

In view of easy production and a low production cost, the fluorinated ether composition of the present invention is preferably a composition comprising a group of at least two types of compounds (1) differing in B, obtained from substantially one type of compound (3) and substantially one type of compound (4). Hereinafter, the present invention will be described with reference to such a composition.

The compound (1) represented by the following formula (1) is a perfluoroether compound having groups A and B respectively bonded to both terminals of a linear perfluoropolyether:

A-O—R$^F$—B  (1)

in the formula (1), the symbols are as follows:
A: a C$_{1-6}$ perfluoroalkyl group, or B;
R$^F$: a linking group represented by the following formula (2):

—(CF$_2$CF$_2$O)$_b$(CF(CF$_3$)CF$_2$O)$_c$(CF$_2$O)$_d$(CF$_2$CF$_2$CF$_2$O)$_e$—  (2)

in the formula (2), the symbols are as follows:
b, c, d and e: each independently an integer of at least 0, and b+c+d+e is from 5 to 150; and in the formula (2), the binding order of repeating units of (CF$_2$CF$_2$O), (CF(CF$_3$)CF$_2$O), (CF$_2$O) and (CF$_2$CF$_2$CF$_2$O) is not limited, and they may be bonded randomly or in a block;

B: a group represented by the following formula (5-1), a group represented by the following formula (5-2), a group represented by the following formula (5-3) or a group represented by the following formula (5-4):

—(CF$_2$)$_a$CFXCH$_2$OCH$_2$CH$_2$CH$_2$SiL$_m$R$_n$  (5-1)

—(CF$_2$)$_a$CFXCH$_2$OCH$_2$CH(SiL$_m$R$_n$)CH$_3$  (5-2)

—(CF$_2$)$_a$CFXCH$_2$OCH$_2$CH=CH$_2$  (5-3)

—(CF$_2$)$_a$CFXCH$_2$OCH=CHCH$_3$  (5-4)

in the formulae (5-1) to (5-4), the symbols are as follows:
a: 0 or 1;
X: F or CF$_3$;
L: a hydrolysable group;
R: a hydrogen atom or a monovalent hydrocarbon group; and m and n: m is an integer of from 1 to 3, n is an integer of from 0 to 2, and m+n=3.

Each of the groups (5-1) and (5-2) has a hydrolyzable silyl group represented by —SiL$_m$R$_n$ at its terminal.

In the formula (1), L is a hydrolyzable group. A hydrolyzable group is a group to be a hydroxy group by hydrolysis. That is, Si-L at the terminal of the compound (1) is converted to a Si—OH group (silanol group) by hydrolysis. Silanol groups are further intermolecularly reacted to form a Si—O—Si bond. Further, a silanol group undergoes a dehydrative condensation reaction with a hydroxy group (substrate-OH) on the surface of a substrate to form a chemical bond (substrate-O—Si). The compound (1), which has a hydrolyzable silyl group at its terminal, has favorable adhesion to a substrate, has favorable durability against repeated rubbing, and is capable of imparting water/oil repellency to the surface of a substrate.

L may, for example, be an alkoxy group, a halogen atom, an acyl group or an isocyanate group (—NCO). The alkoxy group is preferably a C$_{1-4}$ alkoxy group.

L is preferably a C$_{1-4}$ alkoxy group or a halogen atom in view of easy industrial production. The halogen atom is particularly preferably a chlorine atom.

The hydrolyzable group L is particularly preferably a C$_{1-4}$ alkoxy group in view of little out gas at the time of coating and excellent storage stability of the compound (1). Among them, an ethoxy group is particularly preferred in a case where long-term storage stability of the compound (1) is necessary, and a methoxy group is particularly preferred in a case where the reaction time after coating should be short.

In the hydrolyzable silyl group (—SiL$_m$R$_n$), m is an integer of from 1 to 3, preferably 2 or 3, particularly preferably 3. By presence of a plurality of L's in its molecule, bonding to the surface of a substrate will be stronger.

In a case where m is at least 2, the plurality of L's present in one molecule may be the same or different. They are preferably the same, in view of availability of the material and easy production.

In the hydrolyzable silyl group (—SiL$_m$R$_n$), R is a hydrogen atom or a monovalent hydrocarbon group. The monovalent hydrocarbon group may, for example, be an alkyl group, a cycloalkyl group, an alkenyl group or an allyl group.

R is preferably a monovalent hydrocarbon group, particularly preferably a monovalent saturated hydrocarbon group. The number of carbon atoms in the monovalent saturated hydrocarbon group is preferably from 1 to 6, more preferably from 1 to 3, particularly preferably from 1 to 2.

R is preferably a $C_{1-6}$ alkyl group, more preferably a $C_{1-3}$ alkyl group, particularly preferably a $C_{1-2}$ alkyl group, in view of easy preparation.

In the hydrolyzable silyl group ($-SiL_mR_n$), n is an integer of from 0 to 2, and m+n=3. n is preferably 0 or 1, particularly preferably 0. When no or one R is present in its molecule, a bond between the silanol group and the surface of a substrate is likely to be formed.

Preferred as the hydrolyzable silyl group ($-SiL_mR_m$) may be $-Si(OCH_3)_3$, $-SiCH_3(OCH_3)_2$, $-Si(OCH_2CH_3)_3$, $-Si(OCOCH_3)_3$ or $-Si(NCO)_3$. In view of handling efficiency in industrial production, particularly preferred is $-Si(OCH_3)_3$.

In the formula (1), A is a $C_{1-6}$ perfluoroalkyl group or B.

A is preferably a $C_{1-6}$ perfluoroalkyl group, particularly preferably a $C_{1-3}$ perfluoroalkyl group, whereby when the fluorinated ether composition of the present invention is used for surface treatment of a substrate, excellent abrasion resistance is obtained, and the water/oil repellency will hardly be decreased even by repeated rubbing.

The perfluoroalkyl group as A may be linear or branched, and may have a substituent containing a cyclic structure. A is preferably $CF_3CF_2CF_2-$, $CF_3CF_2CF_2-$, $CF_3CF_2CF_2CF_2-$, $CF_3CF_2CF_2CF_2CF_2-$ or $CF_3CF_2CF_2CF_2CF_2CF_2-$, particularly preferably $CF_3-$, $CF_3CF_2-$ or $CF_3CF_2CF_2-$.

In the formula (1), $R^F$ is a linking group represented by the formula (2).

In $R^F$, each of b, c, d and e which are independent of each other, is 0 or an integer of at least 1, and b+c+d+e is from 5 to 150. b+c+d+e is more preferably from 8 to 80, particularly preferably from 10 to 50. When b+c+d+e is within the above range, favorable abrasion resistance will be obtained.

Values of b, c, d and e in the composition are respectively represented by average values.

$R^F$ comprises at least one member selected from the group consisting of repeating units of ($CF_2CF_2O$) (hereinafter sometimes referred to as repeating units ($CF_2CF_2O$)), repeating units of ($CF(CF_3)CF_2O$) (hereinafter sometimes referred to as repeating units ($CF(CF_3)CF_2O$)), repeating units of ($CF_2O$) (hereinafter sometimes referred to as repeating units ($CF_2O$)) and repeating units of ($CF_2CF_2CF_2O$) (hereinafter sometimes referred to as repeating units ($CF_2CF_2CF_2O$)).

In $R^F$, the binding order of the repeating units ($CF_2CF_2O$), the repeating units ($CF(CF_3)CF_2O$), the repeating units ($CF_2O$) and the repeating units ($CF_2CF_2CF_2O$) is not limited, and these repeating units may be bonded randomly or in a block.

Further, in view of stable production of the compound (1), the compound (1) preferably contains no structure $-O-CF_2-O-CH_2CH_2CH_2Si-$. That is, in the compound (1), the repeating units bonded to the trimethylene group in B are preferably the repeating units ($CF_2CF_2O$), the repeating units ($CF(CF_3)CF_2O$) or the repeating units ($CF_2CF_2CF_2O$).

As preferred $R^F$ in the formula (1), groups represented by the following formulae (6-1) to (6-5) (hereinafter sometimes referred to as groups (6-1) to (6-5)) may be mentioned.

$$-(CF_2CF_2O)_{b1}- \quad (6-1)$$

(b1 is an integer of from 5 to 80), $$-(CF(CF_3)CF_2O)_{c1}- \quad (6-2)$$

(c1 is an integer of from 5 to 55), $$-(CF_2CF_2CF_2O)_{e1}- \quad (6-3)$$

(e1 is an integer of from 5 to 55), $$-(CF_2CF_2O)_{b2}-(CF_2O)_{d1}- \quad (6-4)$$

(b2 is an integer of from 4 to 50, and d1 is an integer of from 4 to 50), $$-(CF(CF_3)CF_2O)_{c2}-(CF_2O)_{d2}- \quad (6-5)$$

(c2 is an integer of from 4 to 40, and d2 is an integer of from 4 to 40).

Among them, preferred is the group (6-1), (6-3) or (6-4), whereby the proportion of oxygen atoms per unit molecular weight is high, favorable flexibility will be obtained, and the fat and oil stain removability tends to be high. In the group (6-1), b1 is more preferably from 6 to 60, particularly preferably from 10 to 40. In the group (6-3), e1 is more preferably from 5 to 50, particularly preferably from 8 to 30. The group (6-4) is particularly preferably a group wherein b2 is from 8 to 30 and d1 is from 8 to 30.

The formula (1) contains B at its terminal. B is any one of the groups (5-1) to (5-4). Each of the groups (5-1) and (5-2) is a group containing a hydrolyzable silyl group ($-SiL_mR_n$), and contributes to an improvement in the adhesion to the substrate and an improvement in the abrasion resistance.

The group (5-3) is a group having $-CH_2CH=CH_2$ at its terminal and is a terminal group of the material used for the reaction (hydrosilylation reaction) for formation of the compound (1) remained unreacted.

The group (5-4) is a group having $-CH=CHCH_3$ at its terminal and is a group formed as a by-product in the reaction (hydrosilylation reaction) for formation of the compound (1). The group (5-4) includes a cis-form (group (5-4c)) and a trans-form (group (5-4t)), and usually both are present.

In the fluorinated ether composition of the present invention, the proportion of the group (5-1) is from 90 to 95 mol %, and the proportion of the group (5-2) is from 5 to 10 mol % to the total amount of the groups B present in the fluorinated ether composition. That is, the total proportion of the groups (5-1) and (5-2) is at least 95 mol %. The total proportion of the groups (5-1) and (5-2) is more preferably from 98 to 100 mol %, particularly preferably 100 mol %. The proportion of the group (5-2) is particularly preferably from 7 to 10 mol %. When the proportion of the group (5-1), the proportion of the group (5-2) and the total proportion of the groups (5-1) and (5-2) are within the above ranges, excellent abrasion resistance such that the performance is hardly decreased even by repeated rubbing will be obtained.

The fluorinated ether composition may contain the compound of the formula (1) wherein the group B is the group (5-3) or (5-4), that is, a perfluoroether compound having no hydrolyzable silyl group, however, the proportion of the groups (5-3) and (5-4) to the total amount of the groups B present in the fluorinated ether composition is preferably lower.

Further, the fluorinated ether composition of the present invention may contain impurities inevitable in production in addition to the compound (1).

The molecular weight of the compound (1) is preferably from 1,000 to 10,000, particularly preferably from 1,500 to 10,000. When the molecular weight is within the above range, excellent abrasion resistance such that the performance is hardly decreased even by repeated rubbing will be obtained.

The average molecular weight (Ma) of the fluorinated ether composition of the present invention is preferably from 1,000 to 10,000, particularly preferably from 1,500 to 10,000.

When the average molecular weight (Ma) is within the above range, excellent abrasion resistance such that the performance is hardly decreased even by repeated rubbing will be obtained.

The fluorinated ether composition of the present invention comprises at least two types of compounds (1) having a perfluoroether structure, and by carrying out surface treatment of attaching the composition to the surface of a substrate, favorable water/oil repellency, antifouling property and stain wiping property can be imparted to the substrate surface.

Further, by the fluorinated ether composition of the present invention, it is possible to form a surface-treated layer having excellent abrasion resistance such that the performance is hardly decreased even by repeated rubbing on the substrate surface.

The reason is not clearly understood but is considered as follows. In the fluorinated ether composition of the present invention, the total proportion of the groups (5-1) and (5-2) is at least 95 mol %, and the proportion of the group (5-2) is from 5 to 10 mol %, to the total amount of the groups B in the composition.

The hydrolyzable silyl group in the group (5-1) is bonded to a primary carbon atom, and the hydrolyzable silyl group in the group (5-2) is bonded to a secondary carbon atom. Therefore, the hydrolyzable silyl group in the group (5-2) has a higher hydrolyzability, and is likely to be a silanol group. In the reaction of the hydrolyzable silyl group in the fluorinated ether composition with the substrate, if the reactivity is too low, curing of a coating film of the fluorinated ether composition tends to take long, and the adhesion between the substrate and a surface-treated layer may be insufficient. Whereas, if the reactivity is too high, the storage stability of the fluorinated ether composition tends to be low, thus leading to a decrease in the performance of the surface-treated layer. Since the fluorinated ether composition of the present invention contains the groups (5-1) and (5-2) with the above-mentioned balance, reactivity of the hydrolyzable silyl group with the substrate is moderately improved, whereby a surface-treated layer excellent in the abrasion resistance can be formed.

Further, since the compound (1) has no polar group, even if the composition is applied to a substrate having a polar group, a chemical bond between the hydrolyzable silyl group of the fluorinated ether compound and the substrate surface is likely to be obtained sufficiently.

[Method for Producing Fluorinated Ether Composition]

The fluorinated ether composition of the present invention can be produced by a method of subjecting a compound (3) which is a compound having an allyl group, represented by the following formula (3), and a compound (4) which is a hydrosilane compound, represented by the following formula (4), to hydrosilylation reaction, to introduce a hydrolyzable silyl group to the terminal.

In the present invention, in the hydrosilylation reaction, the higher the rate of conversion of the reaction, the smaller the amount of the unreacted group (5-3) remaining, and the lower the proportion of the group (5-3) to the total amount of the groups B in the fluorinated ether composition. Further, the smaller formation of by-products in the hydrosilylation reaction, the lower the proportion of the group (5-4) to the total amount of the groups B.

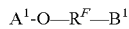  (3)

  (4)

In the formulae (3) and (4), the symbols are as follows:
$A^1$: The same $C_{1-6}$ perfluoroalkyl group as A in the formula (1), or $B^1$;
$R^F$: The same group as $R^F$ in the formula (1);
$B^1$: A group represented by the formula (5-3);
$L^1$: A hydrolyzable group;
R: The same group as R in the formula (1); and
m and n: Respectively the same numbers as m and n in the formula (1).

$R^F$ in the formula (3) being the same group as $R^F$ in the formula (1) means that $R^F$ does not change in the procedure for producing the fluorinated ether composition of the present invention using the compound (3). The same applies to a case where $A^1$ in the formula (3) is a $C_{1-6}$ perfluoroalkyl group, and to R, m and n in the formula (4). $L^1$ in the compound (4) may be a group of the same type as L in the compound (1) or may be a different group. In a case where it is a different group, $L^1$ is Y (wherein Y is a halogen atom).

In a case where L is an alkoxy group in the compound (1), the desired compound (1) can be produced by a method of reacting the compound (3) with the compound (4) wherein $L^1$ is Y for hydrosilylation, and replacing Y with an alkoxy group. Y is particularly preferably a chlorine atom.

To replace Y with an alkoxy group, a known method may be employed. For example, in a case where Y is a chlorine atom, the chlorine atom can be replaced with an alkoxy group by a method of reacting a trialkyl orthoformate such as methyl orthoformate to convert the chlorine atom into an alkoxy group, or a method of reacting an alkali metal alkoxide such as sodium methoxide to convert the chlorine atom into an alkoxy group.

The compound (3) can be obtained by allylating a hydroxy group of a terminal hydroxy group-containing perfluoroether compound represented by the following formula (7) (hereinafter sometimes referred to as compound (7)), which is a precursor of the compound (3).

$$A^1\text{-}O\text{—}R^F\text{—}B^2 \qquad (7)$$

In the formula (7), the symbols are as follows:
$A^1$: The same $C_{1-6}$ perfluoroalkyl group as A in the formula (1), or $B^2$;
$R^F$: The same group as $R^F$ in the formula (1);
$B^2$: A group represented by the following formula (8):

$$\text{—}(CF_2)_a CFXCH_2OH \qquad (8)$$

In the formula (8), the symbols are as follows:
X: The same group as X in the formula (1); and
a: The same number as a in the formula (1).

In the method for producing a fluorinated ether composition of the present invention, the hydrosilylation reaction of the compound (3) with the compound (4) is preferably carried out in the presence of a radical generator.

By using a radical generator, as compared with a method of carrying out a hydrosilylation reaction using a transition metal catalyst, formation of by-products can be suppressed, and the proportion of the group (5-4) to the total amount of the groups B present in the fluorinated ether composition can be reduced to substantially 0.

That is, if the hydrosilylation reaction of the compound (3) with the compound (4) is carried out in the presence of a commonly used transition metal catalyst, the hydrogen atom and the silicon atom in the compound (4) are bonded to the transition metal, and via an intermediate in which a double bond is coordinated to the transition metal, the hydrogen atom is bonded to one side of the double bond and the silicon atom is bonded to the other side, whereby a hydrosilylated product is obtained. On that occasion, the group (5-1) in which silicon is bonded to the terminal carbon atom of the group (5-3) and the group (5-2) in which the hydrogen atom is bonded to the terminal carbon atom, form.

Simultaneously, by the progress of side reaction, the group (5-4) will form.

As the group (5-4), both of the cis-form (group (5-4c)) and the trans-form (group (5-4t)) form.

Although the group (5-4) has a double bond, its reactivity in hydrosilylation tends to be low, and the group (5-4) formed at the time of the hydrosilylation reaction remains as it is even after completion of the reaction.

That is, in the method of carrying out the hydrosilylation reaction in the presence of a conventional transition metal catalyst, a by-product containing the group (5-4), in addition to the desired groups (5-1) and (5-2), will be obtained. In a case where a transition metal catalyst is used, the group (5-3) derived from the material hardly remains.

Whereas, in the present invention, by carrying out the hydrosilylation reaction of the compound (3) with the compound (4) by using a radical generator, a composition in which the total proportion of the desired groups (5-1) and (5-2) is at least 95 mol % to the total amount of the groups B, can be obtained, with substantially no group (5-4) formed.

(Radical Generator)

As the radical generator, a general purpose radical generator such as an azo compound, a peroxide compound or a redox radical generator may be used. The temperature suitable for use of such a radical generator is within a range of from 0 to 150° C., and appropriate temperature ranges respectively depending upon the types of the radical generators are known. The radical generator is preferably a peroxide compound in view of excellent hydrogen abstraction capacity from the hydrosilane compound (compound (4)).

The peroxide compound is preferably an organic peroxide, such as a dialkyl peroxide, a hydroperoxide, a diacylperoxide, a peroxyester, a peroxydicarbonate, a peroxyketal or a ketone peroxide.

The dialkyl peroxide may, for example, be di-tert-butyl peroxide, di-tert-hexyl peroxide, tert-butyl cumyl peroxide, dicumyl peroxide or 2,5-dimethyl-2,5-di(tert-butylperoxy) hexane.

The hydroperoxide may, for example, be tert-butyl hydroperoxide, cumyl hydroperoxide or 1,1,3,3-tetramethylbutyl hydroperoxide.

The diacylperoxide may, for example, be dibenzoyl peroxide, di(4-methylbenzoyl)peroxide, diisobutylyl peroxide or dilauroyl peroxide.

The peroxyester may, for example, be tert-butyl peroxyacetate, tert-butyl peroxypivalate, tert-butyl peroxy-2-ethylhexanoate, tert-butyl peroxylaurate or tert-butyl peroxybenzoate.

The peroxydicarbonate may, for example, be di-n-propyl peroxydicarbonate, diisopropyl peroxydicarbonate or di-sec-butyl peroxydicarbonate.

The peroxyketal may, for example, be 2,2-di(tert-butylperoxy)butane or 1,1-di(tert-butylperoxy)cyclohexane.

The ketone peroxide may, for example, be methyl ethyl ketone peroxide or acetyl acetone peroxide.

(Method for Producing Precursor)

The compound (7) used as a precursor of the compound (3) can be produced by a known method in accordance with the structure of $R^F$. It can be obtained by the same method as disclosed in Patent Document 2 or the like from a commercially available polyoxyalkylene compound as a material. Otherwise, a commercially available terminal alcohol type perfluoropolyether compound may be used, or a commercially available intermediate in production of a perfluoropolyether may be used.

Specific examples are shown below.

<A Case where $R^F$ is the Group (6-1)>

In a case where in the compound (1), A is a perfluoroalkyl group ($R^{F1}$), a is 0 and X is F, the compound (7) can be produced by the following steps (I-1) to (I-5).

Step (I-1): A step to obtain an ester compound by a reaction represented by the following formula (9-1). That is, a polyethylene glycol having one terminal substituted by an alkyl group ($R^{H1}$) is reacted with a perfluorocarboxylic acid fluoride ($R^{F2}C(=O)F$) for esterification. $R^{F2}$ is a linear or a branched perfluoroalkyl group which may contain a cyclic structure, which may contain an etheric oxygen atom (the same applies hereinafter).

As the polyethylene glycol, a mixture of at least two types differing in the valve of b1, i.e. the number of the repeating units ($CH_2CH_2O$), is easily available. In a case where the polyethylene glycol is a mixture, compounds obtainable after the step (I-1) are also mixtures of at least two types differing in the number of the repeating units ($CH_2CH_2O$).

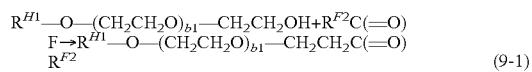

(9-1)

Step (I-2): A step of perfluorinating the ester compound obtained in the step (I-1) by a reaction represented by the following formula (9-2) to obtain a perfluorinated ester compound.

The perfluorination method may, for example, be a liquid phase fluorination method of introducing a fluorine gas into a liquid phase for reaction.

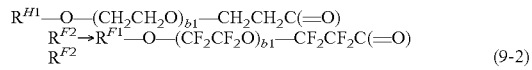

(9-2)

$R^{F1}$ is one in which the hydrogen atom of $R^{H1}$ is replaced by a fluorine atom.

Step (I-3): A step of subjecting the ester bond in the perfluorinated ester compound obtained in the step (I-2) to a decomposition reaction by a reaction represented by the following formula (9-3) to obtain an acid fluoride:

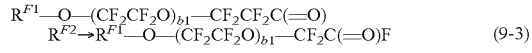

(9-3)

Step (I-4): A step of subjecting the acid fluoride obtained in the step (I-3) and an alcohol ($R^{H2}OH$) to an esterification reaction by a reaction represented by the following formula (9-4) to obtain an ester compound. $R^{H2}$ is an alkyl group (the same applies hereinafter).

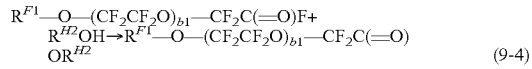

(9-4)

The esterification reaction in this step can be carried out in accordance with a known method (for example, a method disclosed in U.S. Pat. No. 3,810,874).

The ester compound obtained in this step can be obtained also by reacting the perfluorinated ester compound obtained in the step (I-2) with $R^{H2}$OH.

Step (I-5): A step of reducing the ester compound obtained in the step (I-4) by a reaction represented by the following formula (9-5) to obtain an alcohol.

The reduction can be carried out in accordance with a known method as disclosed in e.g. paragraph [0021] of JP-A-10-72568. The reduction is preferably carried out by using a reducing agent such as $NaBH_4$, $BH_3$-THF or $LiAlH_4$.

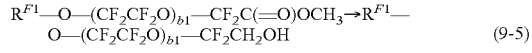

(9-5)

In a case where in the compound (1), A is $B^2$, a is 0 and X is F, the compound (7) can be produced by the following steps (II-1) to (II-5) using a polyethylene glycol having a hydroxy group at each terminal as a material, in the same manner as the above steps (I-1) to (I-5).

Step (II-1): A step to obtain an ester compound by a reaction represented by the following formula (10-1). That is, a polyethylene glycol having a hydroxy group at each terminal is reacted with a perfluorocarboxylic acid fluoride ($R^{F2}C(=O)F$) for esterification.

As the polyethylene glycol, a mixture of at least two types differing in the valve of b1 is easily available. In a case where the polyethylene glycol is a mixture, compounds obtained after the step (II-1) are also mixtures of at least two types differing in the number of the repeating units ($CH_2CH_2O$).

$$HOCH_2CH_2-O-(CH_2CH_2O)_{b1}-CH_2CH_2OH + R^{F2}C(=O)F \rightarrow R^{F2}C(=O)OCH_2CH_2-O-(CH_2CH_2O)_{b1}-CH_2CH_2C(=O)R^{F2} \quad (10\text{-}1)$$

Step (II-2): A step of perfluorinating the ester compound obtained in the step (II-1) by a reaction represented by the following formula (10-2) to obtain a perfluorinated ester compound.

$$R^{F2}C(=O)OCH_2CH_2-O-(CH_2CH_2O)_{b1}-CH_2CH_2OC(=O)R^{F2} \rightarrow R^{F2}C(=O)OCF_2CF_2-O-(CF_2CF_2O)_{b1}-CF_2CF_2C(=O)R^{F2} \quad (10\text{-}2)$$

Step (II-3): A step of subjecting an ester bond in the perfluorinated ester compound obtained in the step (II-2) to a decomposition reaction by a reaction represented by the following formula (10-3) to obtain an acid fluoride.

$$R^{F2}C(=O)OCF_2CF_2-O-(CF_2CF_2O)_{b1}-CF_2CF_2C(=O)R^{F2} \rightarrow FC(=O)CF_2-O-(CF_2CF_2O)_{b1}-CF_2C(=O)F \quad (10\text{-}3)$$

Step (II-4): A step of subjecting the acid fluoride obtained in the step (II-3) and an alcohol ($R^{H2}OH$) to an esterification reaction by a reaction represented by the following formula (10-4) to obtain an ester compound.

$$FC(=O)CF_2-O-(CF_2CF_2O)_{b1}-CF_2C(=O)F + 2R^{H2}OH \rightarrow R^{H2}C(=O)CF_2-O-(CF_2CF_2O)_{b1}-CF_2C(=O)OR^{H2} \quad (10\text{-}4)$$

Step (II-5): A step of reducing the ester compound obtained in the step (II-4) by a reaction represented by the following formula (10-5) to obtain an alcohol.

$$R^{H2}C(=O)CF_2-O-(CF_2CF_2O)_{b1}-CF_2C(=O)OR^{H2} \rightarrow HOCH_2CF_2-O-(CF_2CF_2O)_{b1}-CF_2CH_2OH \quad (10\text{-}5)$$

<A Case where $R^F$ is the Group (6-2)>

In a case where in the compound (1), A is $C_3F_7-$, a is 0 and X is $-CF_3$, the compound (7) can be produced by the following steps (III-1) to (III-3).

Step (III-1): A step of subjecting hexafluoropropylene oxide to ring-opening polymerization by a reaction represented by the following formula (11-1) to obtain an acid fluoride. Ring-opening polymerization can be carried out by using an alkali metal fluoride catalyst (such as KF or CsF) in an ether solvent such as glyme.

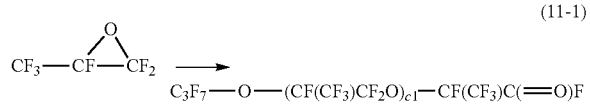
$$\quad (11\text{-}1)$$

Step (III-2): A step of reacting the acid fluoride obtained in the step (III-1) with an alcohol ($R^{H2}OH$) by a reaction represented by the following formula (11-2) for esterification to obtain an ester compound.

$$C_3F_7-O-(CF(CF_3)CF_2O)_{c1}-CF(CF_3)C(=O)F \rightarrow C_3F_7-O-(CF(CF_3)CF_2-CF(CF_3)C(=O)OR^{H2} \quad (11\text{-}2)$$

Step (III-3): A step of reducing the ester compound obtained in the step (III-2) by a reaction represented by the following formula (11-3) to obtain an alcohol.

$$C_3F_7-O-(CF(CF_3)CF_2-CF(CF_3)C(=O)OR^{H2} \rightarrow C_3F_7-O-(CF(CF_3)CF_2-CF(CF_3)CH_2OH \quad (11\text{-}3)$$

<A Case where $R^F$ is the Group (6-3)>

As a compound in which A in the compound (1) is $C_3F_7-$, a is 1 and X is F, i.e. $C_3F_7-O-(CF_2CF_2CF_2O)_{e1}-CF_2CF_2CH_2OH$, commercially available DEMNUM SA (tradename, manufactured by Daikin Industries, Ltd.) can be used.

<A case where $R^F$ is the group (6-4)>

A commercially available Fomblin Z (tradename, manufactured by Solvey Solexis) derivative can be used. The Fomblin Z derivative is produced by a reaction represented by the following formula (12-1) using as a precursor a compound having acid fluoride at each terminal obtained by subjecting tetrafluoroethylene to photooxidation polymerization and decomposing the obtained intermediate. The Fomblin Z derivative may be a compound having alcohol at each terminal or a compound having carboxylic acid at each terminal.

$$CF_2=CF_2+O_2 \rightarrow FC(=O)-(CF_2CF_2O)_{b2}-(CF_2O)_{d1}-C(=O)F \quad (12\text{-}1)$$

As a compound in which A in the compound (1) is the group represented by the formula (8), a is 0 and X is F, i.e. $HOCH_2CF_2-O-(CF_2CF_2O)_{b2}-(CF_2O)_{d1}-CF_2CH_2OH$, commercially available Fomblin ZDOL (tradename, compound having alcohol at each terminal, manufactured by Solvey Solexis) can be used.

A compound in which A in the compound (1) is $-CF_3$, a is 0 and X is F can be produced by the following steps (IV-1) to (IV-2).

Step (IV-1): A step of subjecting one terminal of commercially available Fomblin Z DIAC (tradename, compound having carboxylic acid at each terminal, manufactured by Solvey Solexis) to decarboxylation and fluorination by a reaction represented by the following formula (13-1).

The fluorination can be carried out in accordance with a method disclosed in e.g. paragraph [0036] of JP-A-2011-116947. By this reaction, not only one having one terminal fluorinated, but also one having each terminal fluorinated will form, and a compound in which each terminal remained as a carboxylic acid, may remain. Each component can be separated from such a mixture by polarity of the carboxylic acid e.g. by means of column chromatography using silica or alumina.

$$HOC(=O)CF_2-O-(CF_2CF_2O)_{b2}-(CF_2O)_{d1}-CF_2C(=O)OH \rightarrow CF_3-O-(CF_2CF_2O)_{b2}-(CF_2O)_{d1}-CF_2C(=O)OH \quad (13\text{-}1)$$

Step (IV-2): A step of reducing the compound obtained in the step (IV-1) by a reaction represented by the following formula (13-2) to obtain an alcohol.

$$CF_3-O-(CF_2CF_2O)_{b2}-(CF_2O)_{d1}-CF_2C(=O)OH \rightarrow CF_3-O-(CF_2CF_2O)_{b2}-(CF_2O)_{d1}-CF_2CH_2OH \quad (13\text{-}2)$$

<A Case where $R^F$ is the Group (6-5)>

The compound (7) can be produced from a Fomblin Y derivative obtained by using hexafluoropropylene instead of tetrafluoroethylene in the above formula (12-1). The Fomblin Y derivative is a compound in which the repeating units ($CF_2CF_2O$) in the precursor obtained in the above (12-1) are replaced by ($CF(CF_3)CF_2O$). Except for that, the compound (7) can be obtained in the same manner as in a case where $R^F$ is the group (6-4).

[Method for Producing Substrate Having Surface-Treated Layer]

The fluorinated ether composition of the present invention can be used as it is for a method for producing a substrate having a surface-treated layer, by subjecting a substrate to surface treatment by a dry coating method. The dry coating method may, for example, be vacuum deposition, CVD or sputtering. The fluorinated ether composition of the present invention is suitable to form a surface-treated layer excellent in the adhesion by a vacuum deposition method since the proportion of the groups (5-1) and (5-2) having a hydrolyzable silyl group is high to the total amount of the groups B present in the composition, and is particularly suitable for surface treatment by a vacuum deposition method. Vacuum deposition can be carried out by a known means. The vacuum deposition method can be classified into a resistance heating method, an electron beam heating method, a high frequency induction heating method, a reactive deposition method, a molecular beam epitaxy method, a hot wall deposition method, an ion plating method, a cluster ion beam method, and the like, and any method can be used. A resistance heating method can be suitably used in view of suppression of decomposition of the fluorinated ether compound in the fluorinated ether composition and in view of simplicity of the apparatus. The vacuum deposition apparatus is not particularly limited, and a known apparatus may be used.

In a case where a vacuum deposition method is employed, the film deposition conditions vary depending upon the type of the vacuum deposition method to be applied, and in the case of a resistance heating method, the degree of vacuum before deposition is preferably at most $1 \times 10^{-2}$ Pa, particularly preferably at most $1 \times 10^{-3}$ Pa. The heating temperature of the deposition source is not particularly limited so long as it is a temperature at which the fluorinated ether composition used as the deposition source has a sufficient vapor pressure. It is specifically preferably from 30 to 400° C., particularly preferably from 50 to 300° C. When the heating temperature is at least the lower limit value of the above range, a favorable film deposition rate will be obtained. When it is at most the upper limit value of the above range, the water/oil repellency and the abrasion resistance can be imparted to the substrate surface without decomposition of the fluorinated ether compound.

At the time of vacuum deposition, the substrate temperature is preferably within a range of from room temperature (20 to 25° C.) to 200° C. When the substrate temperature is at most 200° C., a favorable film decomposition rate will be obtained. The upper limit value of the substrate temperature is more preferably at most 150° C., particularly preferably at most 100° C.

In a case where the surface of a substrate is treated by a dry coating method using the fluorinated ether composition, the surface-treated layer to be formed on the surface of the substrate by the treatment has a film thickness of preferably from 1 to 100 nm, particularly preferably from 1 to 50 nm. When the film thickness of the surface-treated layer is at least the lower limit value of the above range, a sufficient effect by the surface treatment is likely to be obtained. When it is at most the upper limit value of the above range, the utilization efficiency tends to be high. To measure the film thickness, for example, an interference patter of reflected X-rays is obtained by an X-ray reflectance method using an X-ray diffractometer for thin-film analysis ATX-G (manufactured by Rigaku Corporation), and from the oscillation period of the interference pattern, the film thickness can be calculated.

With the fluorinated ether composition of the present invention, a substrate having a surface-treated layer can be produced by applying a coating liquid containing the composition to the surface of a substrate to form a coating film, and removing the liquid medium from the coating film.

To apply the coating liquid, a known means may properly be employed.

The application method is preferably a spin coating method, a wipe coating method, a spray coating method, a squeegee coating method, a dip coating method, a die coating method, an ink jet method, a flow coating method, a roll coating method, a casting method, a Langmuir-Blodgett method or a gravure coating method.

A method of removing the liquid medium is a method capable of evaporating and removing the liquid medium from the coating film of the coating liquid, and a known means may properly be employed. The temperature at which the liquid medium is evaporated and removed is a temperature of at least the boiling point of the liquid medium, and is properly selected depending on the type of the liquid medium. Further, in some cases, the liquid medium may be removed under reduced pressure, and accordingly it can be evaporated and removed at a temperature less than the boiling point of the liquid medium. The temperature at which the liquid medium is evaporated and removed is specifically preferably from 10 to 300° C., particularly preferably from 20 to 200° C., although it depends on the type of the liquid medium.

The surface-treated layer to be formed on the surface of the substrate after the liquid medium is evaporated and removed has a film thickness of preferably from 1 to 100 nm, particularly preferably from 1 to 50 nm. When the film thickness of the surface-treated layer is at least the lower limit value of the above range, a sufficient effect by the surface treatment is likely to be obtained. When it is at most the upper limit value of the above range, the utilization efficiency tends to be high. Measurement of the film thickness can be carried out in the same manner as the method of measuring the film thickness of the surface-treated layer formed by a dry coating method.

After the surface-treated layer is formed on the substrate surface by the above dry coating method or method of using the coating liquid, in order to improve the durability against rubbing of the surface-treated layer, an operation to promote the reaction of the fluorinated ether compound with the substrate may be carried out as the case requires. Such an operation may, for example, be heating, humidification or light irradiation. For example, a substrate having a surface-treated layer formed in an atmosphere containing moisture is heated to promote a reaction such as hydrolysis of the hydrolyzable silyl group into a silanol group, a reaction of the silanol group with e.g. a hydroxy group on the substrate surface, or formation of a siloxane bond by a condensation reaction of silanol groups.

After the surface treatment, a compound in the surface-treated layer which is not chemically bonded to another compound or the substrate may be removed as the case requires. As a specific method, for example, a method of washing the surface-treated layer with a solvent, or a method of wiping the surface-treated layer with cloth impregnated with a solvent, may be mentioned.

(Coating Liquid)

The coating liquid of the present invention contains the fluorinated ether composition of the present invention and a liquid medium. The coating liquid may be a solution or a dispersion so long as it is in a liquid form.

The coating liquid can be prepared by mixing the fluorinated ether composition of the present invention and a liquid medium.

The fluorinated ether composition of the present invention is preferably contained in an amount of from 0.001 to 10 mass %, particularly preferably from 0.1 to 1 mass % in the coating liquid.

<Liquid Medium>

The boiling point of the liquid medium in the present invention is preferably from 30 to 200° C., more preferably from 40 to 150° C. The liquid medium is preferably an organic solvent. The organic solvent may be a fluorinated organic solvent or may be a non-fluorinated organic solvent.

The fluorinated organic solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound. Preferred is a compound in which the proportion of the number of fluorine atoms is at least 70% to the total number of fluorine atoms and hydrogen atoms in the fluorinated alkane and which has at least one hydrogen atom. As commercially available products, for example, $C_6F_{13}H$ (AC-2000, tradename, manufactured by Asahi Glass Company, Limited), $C_6F_{13}C_2H_5$ (AC-6000, tradename, manufactured by Asahi Glass Company, Limited) and $C_2F_5CHFCHFCF_3$ (Vertrel, tradename, manufactured by Du Pont Kabushiki Kaisha) may, for example, be mentioned.

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. In the present invention, the fluoroalkyl ether means a difluoroalkyl ether or an alkyl fluoroalkyl ether. The fluoroalkyl group in such two types of ethers is preferably a polyfluoroalkyl group, and the polyfluoroalkyl group may be a perfluoroalkyl group. The alkyl fluoroalkyl ether is preferably an alkyl perfluoroalkyl ether. Preferred is a compound in which the proportion of the number of fluorine atoms is at least 60% to the total number of fluorine atoms and hydrogen atoms in the fluoroalkyl ether, and which has at least one hydrogen atom. As commercially available products, for example, $CF_3CH_2OCF_2CF_2H$ (AE-3000, tradename, manufactured by Asahi Glass Company, Limited), $C_4F_9OCH_3$ (Novec-7100, tradename, manufactured by Sumitomo 3M Limited), $C_4F_9OC_2H_5$ (Novec-7200, tradename, manufactured by Sumitomo 3M Limited) and $C_6F_{13}OCH_3$ (Novec-7300, tradename, manufactured by Sumitomo 3M Limited) may, for example, be mentioned.

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The fluorinated organic solvent is preferably a fluorinated alkane, a fluorinated aromatic compound or a fluoroalkyl ether in view of the solubility of the fluorinated ether composition, and among them, particularly preferred is a fluoroalkyl ether.

The non-fluorinated organic solvent is preferably a compound composed solely of hydrogen atoms and carbon atoms or a compound composed solely of hydrogen atoms, carbon atoms and oxygen atoms, and may, for example, be a hydrocarbon organic solvent, an alcohol organic solvent, a ketone organic solvent, an ether organic solvent or an ester organic solvent.

The hydrocarbon organic solvent is preferably hexane, heptane, cyclohexane or the like.

The alcohol organic solvent is preferably methanol, ethanol, propanol, isopropanol or the like.

The ketone organic solvent is preferably acetone, methyl ethyl ketone, methyl isobutyl ketone or the like.

The ether organic solvent is preferably diethyl ether, tetrahydrofuran, tetraethylene glycol dimethyl ether or the like.

The ester organic solvent is preferably ethyl acetate, butyl acetate or the like.

The non-fluorinated organic solvent is particularly preferably a ketone organic solvent in view of the solubility of the fluorinated ether composition.

The liquid medium in the present invention is preferably at least one organic solvent selected from the group consisting of the fluorinated alkane, the fluorinated aromatic compound, the fluoroalkyl ether, the compound composed solely of hydrogen atoms and carbon atoms and the compound composed solely of hydrogen atoms, carbon atoms and oxygen atoms. Particularly preferred is a fluorinated organic solvent selected from the fluorinated alkane, the fluorinated aromatic compound and the fluoroalkyl ether.

The liquid medium may be a mixture of at least two types of the above organic solvents, or may be a mixture of the above organic solvent with another liquid medium (e.g. an organic solvent other than the above). In the case of the mixture, at least one type selected from the above organic solvents is preferably contained in an amount of at least 90 mass % in total to the entire liquid medium, with a view to increasing the solubility of the fluorinated ether composition.

The coating liquid of the present invention preferably contains from 90 to 90.999 mass % of the liquid medium, particularly preferably from 99 to 99.99 mass %.

The coating liquid may contain another component in addition to the fluorinated ether composition and the liquid medium, within a range not to impair the effects of the present invention.

Further, in the coating liquid, a part of the fluorinated ether composition may be formed into a partially hydrolyzed condensate. A partially hydrolyzed condensate is a compound formed in such a manner that at least two molecules of the fluorinated ether compound undergo a hydrolytic condensation reaction to form a multimer. That is, it is a compound formed in such a manner that a hydrolyzable group of the fluorinated ether compound is hydrolyzed, and silanol groups thus formed undergo a dehydrative condensation reaction to form a siloxane bond, whereby the fluorinated ether compound is formed into a multimer. A partially hydrolyzed condensate multimerized to such an extent that the solubility in the liquid medium is not decreased can impart favorable water/oil repellency to the substrate surface in the same manner as the fluorinated ether compound.

Another component which the coating liquid may contain may, for example, be a known additive such as an acid catalyst or a basic catalyst, which promotes hydrolysis of the hydrolyzable silyl group and a condensation reaction.

The acid catalyst may, for example, be hydrochloric acid, nitric acid, acetic acid, sulfuric acid, phosphoric acid, sulfonic acid, methanesulfonic acid or p-toluenesulfonic acid.

The basic catalyst may, for example, be sodium hydroxide, potassium hydroxide or ammonia.

In the coating liquid, the content of another component is preferably at most 10 mass %, particularly preferably at most 1 mass %.

The solid content concentration of the coating liquid is preferably from 0.001 to 10 mass %, particularly preferably from 0.01 to 1 mass %.

The solid content concentration of the coating liquid in the present invention is calculated from the mass of the solution before heating and the mass after the coating liquid is heated by a convection dryer at 120° C. for 4 hours and the liquid medium is evaporated and removed. Further, the solid content concentration of the fluorinated ether composition can be calculated from the solid content concentration of the coating liquid and the amounts of charge of the fluorinated ether composition, the liquid medium and the like used for production of the coating liquid.

(Substrate)

In the present invention, the substrate to be subjected to surface treatment is not particularly limited so long as it is a substrate to which impartment of the water/oil repellency is required. The material of the surface of the substrate may, for example, be a metal, a resin, glass, a ceramic or a composite material thereof.

By surface treatment of the substrate using the fluorinated ether composition or the coating liquid of the present invention to form a surface-treated layer, favorable water/oil repellency is imparted and in addition, excellent abrasion resistance such that the water/oil repellency is hardly decreased even by repeated rubbing of the surface, can be obtained. Accordingly, the substrate having a surface-treated layer thus obtained, which has favorable water/oil repellency and excellent abrasion resistance such that the water/oil repellency is hardly decreased even by repeated rubbing of the surface, is useful as a member constituting a touch panel. A touch panel means an input device of an input/display device (touch panel device) comprising a device to input contact location information by contact by e.g. fingers and a display device in combination. The touch panel comprises a substrate, and depending upon the input detection method, a transparent electrically conductive membrane, an electrode, a wiring, an IC, etc. By disposing the surface having a surface-treated layer of the substrate as an input screen of the touch panel, a touch panel having favorable fingerprint removability can be obtained.

The material of the substrate for a touch panel has translucency. In this specification, "having translucency" means a normal incidence visible light transmittance of at least 25% in accordance with JIS R3106.

The material of the substrate for a touch panel is preferably glass or a transparent resin substrate. The glass is preferably soda lime glass, borosilicate glass, alkali-free glass, crystal glass or quartz glass, particularly preferably chemically tempered glass. The transparent resin substrate is preferably polycarbonate.

Further, the substrate in the present invention is also preferably a substrate for a display constituting the outermost surface of a display such as a liquid crystal display, a CRT display, a projection display, a plasma display or an EL display, and by forming a surface-treated layer by surface treatment using the fluorinated ether composition or the coating liquid of the present invention, favorable stain removability will be obtained.

EXAMPLES

Now, the present invention will be described in further detail with reference to Examples. However, it should be understood that the present invention is by no means restricted to such specific Examples. Examples 1 to 9, 21 to 26 and 31 to 36 are Examples of the present invention, and Examples 10 to 13 and 37 are Comparative Examples.

[Method for Measuring Proportion of Group B]

As described above, to calculate the proportion of the groups B (breakdown of the groups (5-1) to (5-4)), the groups (5-1) to (5-4) were identified by $^1$H-NMR (solvent: CDCl$_3$, internal standard: TMS) and the molar ratios of the respective groups were calculated.

For example, in each of the group (5-1) to (5-4), in a case where X is F, L is Cl, m is 3 and n is 0, the chemical shift position of proton at a moiety in a bracket [ ] of each group is obtained as shown in the following bracket [(ppm)], and the integrated intensity of the moiety in the bracket [ ] of each group is determined, the integrated intensity is divided by the number of hydrogen atoms, and from the obtained proportion, the molar ratio of each of the groups (5-1) to (5-4) was calculated.

| | |
|---|---|
| —CF$_2$CH$_2$OCH$_2$CH$_2$[CH$_2$]SiCl$_3$[1.5 (ppm)] | Group (5-1) |
| —CF$_2$CH$_2$OCH$_2$CH(SiCl$_3$)[CH$_3$][1.3 (ppm)] | Group (5-2) |
| —CF$_2$CH$_2$OCH$_2$CH=[CH$_2$][5.3 (ppm)] | Group (5-3) |
| —CF$_2$CH$_2$OCH=[CH]CH$_3$[4.6 (ppm)] | Group (5-4c) |
| —CF$_2$CH$_2$OCH=[CH]CH$_3$[4.9 (ppm)] | Group (5-4t) |

[Method for Measuring Repeating Units in R$^F$]

The repeating units (CF$_2$CF$_2$O), the repeating units (CF(CF$_3$)CF$_2$O), the repeating units (CF$_2$O) and the repeating units (CF$_2$CF$_2$CF$_2$O) were identified by $^{19}$F-NMR (solvent: CDCl$_3$, internal standard: CDCl$_3$), and from the ratio of their integrated intensity to the integrated intensity of the terminal group (for example, —OCF$_2$CH$_2$O—), the number of the repeating units was calculated.

Compounds used in the following Examples are as follows. In the following, the values of b to e are average values.

[Compound (3)]

| | |
|---|---|
| CF$_3$O(CF$_2$CF$_2$O)$_b$CF$_2$CH$_2$OCH$_2$CH=CH$_2$ (b=7.0, Mn=1,020) | Compound (3-1) |
| CF$_3$O(CF$_2$CF$_2$O)$_b$CF$_2$CH$_2$OCH$_2$CH=CH$_2$ (b=14.8, Mn=1,920) | Compound (3-2) |
| CF$_3$O(CF$_2$CF$_2$O)$_b$CF$_2$CH$_2$OCH$_2$CH=CH$_2$ (b=19.3, Mn=2,440) | Compound (3-3) |
| CF$_3$CF$_2$CF$_2$O(CF(CF$_3$)CF$_2$O)$_c$CF(CF$_3$)CH$_2$OCH$_2$CH=CH$_2$ (c=6.0,Mn=1,350) | Compound (3-4) |
| CH$_2$=CHCH$_2$OCH$_2$CF$_2$O(CF$_2$CF$_2$O)$_b$CF$_2$CH$_2$OCH$_2$CH=CH$_2$ (b=14.6,Mn=1,950) | Compound (3-5) |
| CH$_2$=CHCH$_2$OCH$_2$CF$_2$O(CF$_2$CF$_2$O)$_b$(CF$_2$O)$_d$CF$_2$CH$_2$OCH$_2$CH=CH$_2$ (b=16.7,d=21.1,Mn=3,590) | Compound (3-6) |

[Compound (4)]

| | |
|---|---|
| HSiCl$_3$ | Compound (4-1) |
| HSi(OMe)$_3$ | Compound (4-2) |

[Radical Generator, Etc.]

(1): Di-tert-butyl peroxide (radical generator).
(2): Dibenzoyl peroxide (radical generator).
(3): Hexachloroplatinic acid hexahydrate (catalyst).
(4): Platinum/divinyltetramethyldisiloxane complex (catalyst).

[Solvent]

Solvent (1): 1,3-Di(trifluoromethyl)benzene
Solvent(2): Perfluorohexylethane

Examples 1 to 13

Production of Fluorinated Ether Composition

Into a closed type pressure resistant container (internal capacity: 50 mL, internal cylinder made of PTFE), compound (3), compound (4), a radical generator (or a catalyst) and a solvent in amounts as identified in Table 1 were charged and stirred.

Then, the closed type pressure resistant container was put in an oil bath at a reaction temperature as identified in Table 1, followed by stirring for 8 hours. From the obtained crude reaction liquid, unreacted compound (4), the catalyst or its decomposed product, and the solvent were distilled off to obtain each of fluorinated ether compositions (1) to (13) comprising compound (1) as identified in Table 2. A, X, L, a to e (average values), m and n, and the average molecular weight (Ma) of the obtained compound (1) are shown in Table 2.

With respect to the fluorinated ether composition, groups (5-1) to (5-3), (5-4c) and (5-4t) present in the fluorinated ether composition were respectively identified, and the respective proportions to their total amount (the total amount of the groups B) were obtained. Further, assuming that the total molar amount of the groups B present in the fluorinated ether composition is the same as the number of moles of the group (5-3) present in compound (3) as the material, the proportions of conversion of the group (5-3) in compound (3) into the groups (5-1), (5-2), (5-4c) and (5-4t) (conversion ratios, unit: mol %) were calculated and shown in Table 2.

The results of measurement of fluorinated ether compositions (1), (7) and (9) by $^{19}$F-NMR (solvent: CDCl$_3$) were as follows.

Fluorinated ether composition (1) δ (ppm): −56.3 (3F, CF$_3$—), −78.2 (2F, —OCF$_2$CH$_2$O—), −89.5 to −91.4 (28F, —CF$_2$CF$_2$O—)

Fluorinated ether composition (7) δ (ppm): −79.0 to −62.3 (38F, CF$_3$—, CF$_2$O—), −129.3 (2F, CF$_3$CF$_2$CF$_2$O—), −131.9 to −132.4 (1F, —CF(CF$_3$)CH$_2$O—), −143.9 to −144.7 (6F, —CF(CF$_3$)CF$_2$O—)

Fluorinated ether composition (9) δ (ppm): −51.9 to −55.3 (40.8F, —OCF$_2$O—), −77.8 to −79.9 (4F, —OCF$_2$CH$_2$O—), −88.6 to −90.6 (64.8F, —CF$_2$CF$_2$O—)

TABLE 1

| Ex. | Compound (3) Type | [mmol] | Compound (4) Type | [mmol] | Radical generator or the like Type | [mmol] | Solvent Type | [g] | Reaction temperature [° C.] | Fluorinated ether composition obtained |
|---|---|---|---|---|---|---|---|---|---|---|
| 1 | (3-1) | 10 | (4-1) | 80 | (1) | 2.0 | (1) | 10 | 120 | (1) |
| 2 | (3-1) | 10 | (4-1) | 80 | (1) | 0.2 | (1) | 10 | 120 | (2) |
| 3 | (3-1) | 10 | (4-1) | 80 | (1) | 1.0 | (2) | 10 | 120 | (3) |
| 4 | (3-1) | 10 | (4-1) | 80 | (2) | 1.0 | (1) | 10 | 90 | (4) |
| 5 | (3-2) | 2.1 | (4-1) | 21 | (1) | 0.21 | (1) | 5 | 120 | (5) |
| 6 | (3-3) | 2.1 | (4-1) | 16 | (1) | 0.41 | (1) | 5 | 120 | (6) |
| 7 | (3-4) | 10 | (4-1) | 80 | (1) | 1.0 | (1) | 10 | 120 | (7) |
| 8 | (3-5) | 3.7 | (4-1) | 74 | (1) | 0.37 | (1) | 10 | 120 | (8) |
| 9 | (3-6) | 1.7 | (4-1) | 34 | (1) | 0.21 | (1) | 5 | 120 | (9) |
| 10 | (3-1) | 10 | (4-1) | 80 | — | — | (1) | 10 | 120 | (10) |
| 11 | (3-1) | 10 | (4-2) | 80 | (3) | 0.005 | (1) | 10 | 60 | (11) |
| 12 | (3-1) | 10 | (4-1) | 80 | (4) | 0.005 | (1) | 10 | 60 | (12) |
| 13 | (3-1) | 10 | (4-2) | 80 | (4) | 0.005 | (2) | 10 | 60 | (13) |

TABLE 2

| Ex. | Fluorinated ether composition obtained | A | a | b | c | d | e | X | L | m | n |
|---|---|---|---|---|---|---|---|---|---|---|---|
| 1 | (1) | CF$_3$ | 0 | 7.0 | 0 | 0 | 0 | F | Cl | 3 | 0 |
| 2 | (2) | CF$_3$ | 0 | 7.0 | 0 | 0 | 0 | F | Cl | 3 | 0 |
| 3 | (3) | CF$_3$ | 0 | 7.0 | 0 | 0 | 0 | F | Cl | 3 | 0 |
| 4 | (4) | CF$_3$ | 0 | 7.0 | 0 | 0 | 0 | F | Cl | 3 | 0 |
| 5 | (5) | CF$_3$ | 0 | 14.9 | 0 | 0 | 0 | F | Cl | 3 | 0 |
| 6 | (6) | CF$_3$ | 0 | 19.3 | 0 | 0 | 0 | F | Cl | 3 | 0 |
| 7 | (7) | CF$_3$CF$_2$CF$_2$ | 0 | 0 | 6.0 | 0 | 0 | CF$_3$ | Cl | 3 | 0 |
| 8 | (8) | B | 0 | 14.5 | 0 | 0 | 0 | F | Cl | 3 | 0 |
| 9 | (9) | B | 0 | 16.2 | 0 | 20.4 | 0 | F | Cl | 3 | 0 |
| 10 | (10) | CF$_3$ | 0 | 7.0 | 0 | 0 | 0 | F | Cl | 3 | 0 |
| 11 | (11) | CF$_3$ | 0 | 7.0 | 0 | 0 | 0 | F | OCH$_3$ | 3 | 0 |
| 12 | (12) | CF$_3$ | 0 | 7.0 | 0 | 0 | 0 | F | Cl | 3 | 0 |
| 13 | (13) | CF$_3$ | 0 | 7.0 | 0 | 0 | 0 | F | OCH$_3$ | 3 | 0 |

| Ex. | Proportion [mol %] to the total amount of groups B in fluorinated ether composition | | | | | Conversion ratio [mol %] | Average molecular weight Ma |
|---|---|---|---|---|---|---|---|
| | Group (5-1) | Group (5-2) | Group (5-3) | Group (5-4c) | Group (5-4t) | | |
| 1 | 91 | 9 | 0 | 0 | 0 | 100 | 1,150 |
| 2 | 90 | 8 | 2 | 0 | 0 | 98 | 1,150 |
| 3 | 92 | 8 | 0 | 0 | 0 | 100 | 1,150 |
| 4 | 91 | 9 | 0 | 0 | 0 | 100 | 1,150 |
| 5 | 92 | 8 | 0 | 0 | 0 | 100 | 2,060 |

TABLE 2-continued

| | | | | | | | |
|---|---|---|---|---|---|---|---|
| 6 | 91 | 9 | 0 | 0 | 0 | 100 | 2,570 |
| 7 | 93 | 7 | 0 | 0 | 0 | 100 | 1,490 |
| 8 | 92 | 8 | 0 | 0 | 0 | 100 | 2,220 |
| 9 | 91 | 9 | 0 | 0 | 0 | 100 | 3,730 |
| 10 | 31.6 | 5.0 | 61.0 | 2.0 | 0.4 | 39 | 1,070 |
| 11 | 78 | 4 | 0 | 12 | 6 | 100 | 1,120 |
| 12 | 54 | 11 | 0 | 23 | 12 | 100 | 1,100 |
| 13 | 73 | 1 | 0 | 16 | 10 | 100 | 1,100 |

As evident from the results in Table 2, in each of the fluorinated ether compositions (1) to (9) in Examples 1 to 9 in which a radical generator was used, the proportion of the group (5-1) was from 90 to 93 mol %, and the proportion of the group (5-2) was from 7 to 9 mol %. The total amount of the groups (5-1) to (5-2) was from 98 to 100 mol %, and the group (5-4) to be formed by the side reaction was not confirmed by $^1$H-NMR in each Example. In a case where it was not observed, the proportion is represented as 0 mol % in the Table.

Whereas in Example 10 in which a radical generator or the like was not used, the reaction proceeded by adjusting the reaction temperature to be 120° C., however, the conversion ratio was low due to a low reaction rate. Further, the group (5-4) was formed by the side reaction although its amount was small as compared with Examples 11 to 13.

In Examples 11 to 13 in which a transition metal catalyst was used, the reaction favorably proceeded and a conversion ratio of 100 mol % was obtained, however, the group (5-4) was formed by the side reaction in a total amount of from 18 to 35 mol %, and the amount of formation of the groups (5-1) and (5-2) was small.

Example 21

Production of Fluorinated Ether Composition

In the fluorinated ether composition (3) obtained in Example 3, the hydrolyzable silyl group of compound (1) constituting the fluorinated ether composition is a trichlorosilyl group. In this Example, a reaction to convert the trichlorosilyl group in the fluorinated ether composition into a trimethoxysilyl group was carried out.

That is, 11 g (10 mmol) of the fluorinated ether composition (3) and 10 g of 1,3-di(trifluoromethyl)benzene as a solvent were put in a flask (internal capacity: 50 mL) equipped with a dropping funnel, followed by stirring at room temperature. 8.6 g of a mixed solution of trimethyl orthoformate and methanol (trimethyl orthoformate:methanol=25:1 [mol:mol]) was dropped. After dropping, reaction was carried out at 60° C. for 3 hours. After completion of the reaction, the solvent and the like were distilled off under reduced pressure, 1 g of activated carbon was added to the residue, followed by stirring for one hour, filtration through a membrane filter with a pore diameter of 0.5 μm was carried out to obtain fluorinated ether composition (21) in which the trichlorosilyl group was converted to a trimethoxysilyl group.

Between before and after the reaction, the number of the repeating units of compound (1), and the proportions of the groups (5-1) and (5-2) in the fluorinated ether composition were not changed.

Examples 22 to 26

Production of Fluorinated Ether Composition

With respect to the fluorinated ether compositions (5), (6), (7), (8) and (9) obtained in Examples 5, 6, 7, 8 and 9, in the same manner as in Example 21, a reaction to convert the trichlorosilyl group in such a composition into a trimethoxysilyl group was carried out to obtain fluorinated ether compositions (22), (23), (24), (25) and (26).

Between before and after the reaction, in each of the fluorinated ether compositions, the number of the repeating units of the compound (1) and the proportions of the groups (5-1) and (5-2) in the fluorinated ether composition were not changed.

Examples 31 to 37

Formation of Surface-Treated Layer and Evaluation of Substrate Having Surface-Treated Layer Using each of the fluorinated ether composition (21) to (26) obtained in Examples 21 to 26 and the fluorinated ether composition (13) obtained in Example 13, surface treatment was carried out on a substrate. In each Example, a substrate having a surface-treated layer was produced by each of the following dry coating method and application method. As the substrate, chemically tempered glass was used. The obtained substrates having a surface-treated layer were evaluated by the following methods. The results are shown in Table 3.

(Dry Coating Method)

The dry coating method was carried out by using a vacuum deposition apparatus (VTR-350M manufactured by ULVAC, Inc.) (vacuum deposition method). 0.5 g of each composition was filled in a boat made of molybdenum in the vacuum deposition apparatus, and the vacuum deposition apparatus was evacuated of air to at most $1 \times 10^{-3}$ Pa. The boat having the composition disposed was heated at a heating rate of at most 10° C./min, and at the time when the deposition rate measured by a quartz film thickness meter exceeded 1 nm/sec, a shutter was opened to initiate film deposition on the substrate surface. At the time when the film thickness reached about 50 nm, the shutter was closed to complete film deposition on the substrate surface. The substrate on which the fluorinated ether composition was deposited was subjected to heat treatment at 200° C. for 30 minutes and then washed with $C_3HF_5Cl_2$ (AK-225, tradename, manufactured by Asahi Glass Company, Limited) which is a fluorinated solvent to obtain a substrate having a surface-treated layer.

(Application Method)

The fluorinated ether composition obtained in each Example and $C_4F_9OC_2H_5$ (Novec-7200, tradename, manufactured by Sumitomo 3M Limited) as a solvent were mixed to prepare a coating liquid having a solid content concentration of 0.05 mass %. The substrate was dipped in the coating liquid (dip coating method), left to stand for 30 minutes and then pulled out. The substrate was dried at 200° C. for 30 minutes and washed with AK-225 (tradename, manufactured by Asahi Glass Company, Limited) which is a fluorinated solvent to obtain a substrate having a surface-treated layer.

(Evaluation Methods)

<Initial Water Contact Angle>

With respect to each of the surface-treated substrates (substrates having a surface-treated layer) by the dry coating method and the application method, the water contact angle (initial) was measured by the following measurement method.

<Initial Water Sliding Angle>

With respect to the surface-treated substrate (the substrate having a surface-treated layer) by the application method, the water sliding angle (initial) was measured by the following measurement method.

<Method for Evaluating Abrasion Resistance>

With respect to the substrate having a surface-treated layer, an abrasion resistance test was carried out under the following test conditions using the following testing machine in accordance with JIS L0849. The smaller the decrease of the water repellency (water contact angle) when the number of rubbing was increased, the smaller the decrease in the performance by rubbing, and the more excellent the abrasion resistance.

Testing machine: Reciprocal traverse tester (manufactured by KNT)

Test conditions: Cellulose nonwoven fabric (BEMCOT M-3, manufactured by Asahi Kasei Corporation) was reciprocated predetermined abrasion times under a load of 1 kg, whereupon the water contact angle was measured by the following method.

<Method for Measuring Water Contact Angle>

The contact angle of 2 μL of distilled water placed on the surface-treated surface of the substrate having a surface-treated layer was measured by a contact angle measuring apparatus DM-500 (manufactured by Kyowa Interface Science Co., Ltd.). Measurement was carried out on different five positions on the surface-treated surface of the substrate, and their average value was calculated. To calculate the contact angle, 2θ method was employed.

<Method for Measuring Water Sliding Angle>

The surface-treated surface of the substrate having a surface-treated layer was held horizontally, a water droplet of 50 μL was dropped thereon, and then the substrate was gradually inclined, and the angle (sliding angle) between the substrate surface and the horizontal plane when the droplet started to slide, was measured by a sliding angle measuring apparatus SA-11 (manufactured by Kyowa Interface Science Co., Ltd.).

Values in brackets ( ) in Table 3 mean a state that the value of the contact angle vary due to scars on the glass surface.

As evident from the results in Table 3, in Examples 31 to 36 in which the fluorinated ether compositions (21) to (26) prepared by using a radical generator as a catalyst were used, the substrate having a surface-treated layer formed by the dry coating method had a high contact angle even after 50,000 times of abrasion. Whereas, in Example 37 in which the fluorinated ether composition (13) prepared by using a transition metal catalyst was used, the substrate having a surface-treated layer formed by the dry coating method had scars after 50,000 times of abrasion and was confirmed to be inferior in the durability.

Further, although the fluorinated ether compositions (21) and (22) have the same type of the repeating units in the compound (1), the fluorinated ether composition (22) has a higher average molecular weight (Ma). In Example 32 in which the fluorinated ether composition (22) was used, the substrate having a surface-treated layer formed by the dry coating method maintained a high contact angle even after 100,000 times of abrasion, and is confirmed to be particularly excellent in the durability.

In Examples 31 to 36 in which the fluorinated ether compositions (21) to (26) were used, even the substrate having a surface-treated layer formed by the application method was confirmed to have favorable water repellency.

INDUSTRIAL APPLICABILITY

The composition comprising fluorinated ether compounds of the present invention can be used as a surface treating agent which can impart favorable water/oil repellency to the substrate surface. A surface-treated layer formed by such a surface treating agent has high stain removability such that stains on the surface-treated layer can easily be wiped off. For example, of a touch panel having such a surface-treated layer, the water/oil repellency is hardly decreased even after repeatedly rubbed by fingers, and the performance such that the fingerprints can easily be removed by wiping is maintained for a long period of time.

This application is a continuation of PCT Application No. PCT/JP2012/074079, filed on Sep. 20, 2012, which is based upon and claims the benefit of priority from Japanese Patent Application No. 2011-206033 filed on Sep. 21, 2011. The contents of those applications are incorporated herein by reference in its entirety.

TABLE 3

| Ex. | Fluorinated ether composition used for evaluation | Average molecular weight Ma | Dry coating method; evaluation water contact angle [°] | | | | Application method; evaluation | |
|---|---|---|---|---|---|---|---|---|
| | | | Initial | Abrasion times | | | Initial | |
| | | | | After 10,000 times of abrasion | After 50,000 times of abrasion | After 100,000 times of abrasion | Water contact angle [°] | Water sliding angle [°] |
| 31 | (21) | 1,140 | 110 | 109 | 104 | (77) | 113 | 5 |
| 32 | (22) | 2,040 | 112 | 110 | 108 | 104 | 112 | 6 |
| 33 | (23) | 2,560 | 113 | 113 | 112 | 109 | 113 | 5 |
| 34 | (24) | 1,470 | 110 | 106 | 101 | (73) | 111 | 9 |
| 35 | (25) | 2,200 | 110 | 107 | 98 | (60) | 107 | 11 |
| 36 | (26) | 3,820 | 101 | 106 | 104 | (57) | 105 | 10 |
| 37 | (13) | 1,110 | 110 | 101 | (90) | (44) | | |

What is claimed is:

1. A fluorinated ether composition comprising at least two types of fluorinated ether compounds of formula (1) differing in group B, in a proportion of a group of formula (5-1) being from 90 to 95 mol % and a proportion of a group of formula (5-2) being from 5 to 10 mol % to the total amount of groups B present in the composition:

$$A-O-R^F-B \qquad (1)$$

in the formula (1), the symbols are as follows:
A: a $C_{1-6}$ perfluoroalkyl group, or B;
$R^F$: a linking group of formula (2):

$$-(CF_2CF_2O)_b(CF(CF_3)CF_2O)_c(CF_2O)_d(CF_2CF_2CF_2O)_e- \qquad (2)$$

in the formula (2), the symbols are as follows:
b, c, d and e: each independently an integer of at least 0, and b+c+d+e is from 5 to 150; and in the formula (2), the binding order of repeating units of $(CF_2CF_2O)$, $(CF(CF_3)CF_2O)$, $(CF_2O)$ and $(CF_2CF_2CF_2O)$ is not limited, and they may be bonded randomly or in a block;
B: a group of formula (5-1), a group of formula (5-2), a group of formula (5-3) or a group of formula (5-4):

$$-(CF_2)_aCFXCH_2OCH_2CH_2CH_2SiL_mR_n \qquad (5-1)$$

$$-(CF_2)_aCFXCH_2OCH_2CH(SiL_mR_n)CH_3 \qquad (5-2)$$

$$-(CF_2)_aCFXCH_2OCH_2CH=CH_2 \qquad (5-3)$$

$$-(CF_2)_aCFXCH_2OCH=CHCH_3 \qquad (5-4)$$

in the formulae (5-1) to (5-4), the symbols are as follows;
a: 0 or 1;
X: F or $CF_3$;
L: an alkoxy group, a halogen atom, an acyl group, or an isocyanate group;
R: a hydrogen atom or a monovalent hydrocarbon group; and
m and n: m is an integer of from 1 to 3, n is an integer of from 0 to 2, and m+n=3.

2. The fluorinated ether composition according to claim 1, wherein B comprises a group of formula (5-1) and a group of formula (5-2) and the total amount of the group of formula (5-1) and the group of formula (5-2) is from 98 to 100 mol % to the total amount of the groups B present in the composition.

3. The fluorinated ether composition according to claim 1, wherein L is a $C_{1-4}$ alkoxy group or a halogen atom.

4. A method for producing a fluorinated ether composition, which comprises reacting a compound of formula (3) and a compound of formula (4) in the presence of a radical generator to obtain the fluorinated ether composition as defined in claim 1:

$$A^1-O-R^F-B^1 \qquad (3)$$

$$HSiL^1_mR_n \qquad (4)$$

in the formulae (3) and (4), the symbols are as follows:
$A^1$: the same $C_{1-6}$ perfluoroalkyl group as A in the formula (1) or $B^1$;
$R^F$: the same group as $R^F$ in the formula (1);
$B^1$: a group of formula (5-3);
$L^1$: an alkoxy group, a halogen atom, an acyl group, or isocyanate group;
R: the same group as R in the formula (1); and
m and n: respectively the same numbers as m and n in the formula (1).

5. The method for producing a fluorinated ether composition according to claim 4, wherein the radical generator is an organic peroxide.

6. The method for producing a fluorinated ether composition according to claim 4, wherein the compound of formula (3) and the compound of formula (4) wherein $L^1$ is a chlorine atom are reacted, and then $L^1$ in the reaction product is converted to an alkoxy group to obtain a fluorinated ether composition comprising:
at least two types of fluorinated ether compounds of formula (1) differing in group B, in a proportion of a group f formula (5-1) being from 90 to 95 mol % and a proportion of a group of formula (5-2) being from 5 to 10 mol % to the total amount of groups B present in the composition:

$$A-O-R^F-B \qquad (1)$$

in the formula (1), the symbols are as follows:
A: a $C_{1-6}$ perfluoroalkyl group, or B;
$R^F$: a linking group of formula (2);

$$-(CF_2CF_2O)_b(CF(CF_3)CF_2O)_c(CF_2O)_d(CF_2CF_2CF_2O)_e- \qquad (2)$$

in the formula (2), the symbols are as follows:
d and e: each independently an integer of at least 0, and b+c++e is from 5 to 150; and in the formula (2), the binding order of repeating units of $(CF_2CF_2O)$, $(CF(CF_3)CF_2O)$, $(CF_2O)$ and $(CF_2CF_2CF_2O)$ is not limited, and they may be bonded randomly or in a block;
B: a group of formula (5-1), a group of formula (5-2), a group of formula (5-3) or a group of formula (5-4):

$$-(CF_2)_aCFXCH_2OCH_2CH_2CH_2SiL_mR_n \qquad (5-1)$$

$$-(CF_2)_aCFXCH_2OCH_2CH(SiL_mR_n)CH_3 \qquad (5-2)$$

$$-(CF_2)_aCFXCH_2OCH_2CH=CH_2 \qquad (5-3)$$

$$-(CF_2)_aCFXCH_2OCH=CHCH_3 \qquad (5-4)$$

in the formulae (5-1) to (5-4), the symbols are as follows:
a: 0 or 1;
X: F or $CF_3$;
L is an alkoxy group
R: a hydrogen atom or a monovalent hydrocarbon group; and
m and n: m is an integer of from 1 to 3, n is an integer of from 0 to 2, and m+n=3.

7. A coating liquid containing the fluorinated ether composition as defined in claim 1, and a liquid medium.

8. The coating liquid according to claim 7, wherein the liquid medium contains at least one fluorinated organic solvent selected from the group consisting of a fluorinated alkane, a fluorinated aromatic compound and a fluoroalkyl ether.

9. A method for producing a substrate having a surface-treated layer, which comprises applying the fluorinated ether composition as defined in claim 1, to the surface of a substrate by vacuum deposition.

10. A method for producing a substrate having a surface-treated layer, which comprises applying the coating liquid as defined in claim 7 on the surface of a substrate, and removing the liquid medium.

11. The method for producing a substrate having a surface-treated layer according to claim 9, wherein the material of the surface of the substrate is a metal, a resin, glass, a ceramic or a composite material thereof.

12. A substrate having a surface-treated layer, obtained by treatment with the fluorinated ether composition as defined in claim 1.

13. A touch panel having a surface-treated layer obtained by treatment with the fluorinated ether composition as defined in claim 1 on the input screen.

* * * * *